Aug. 22, 1950     W. K. FAIRCHILD     2,519,448
MIXING VALVE
Filed March 14, 1947
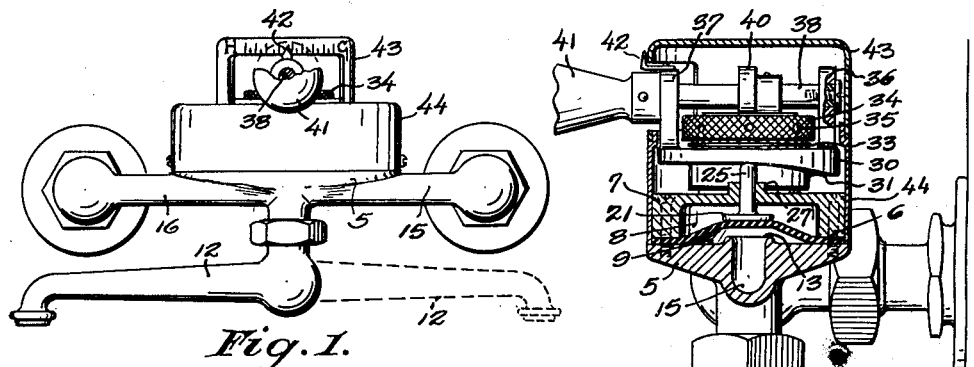
Fig. 1.
Fig. 4.
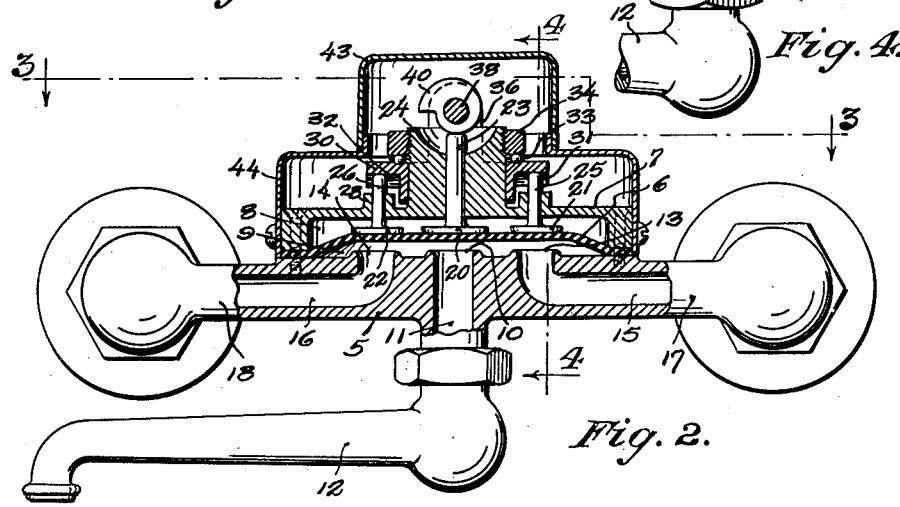
Fig. 2.
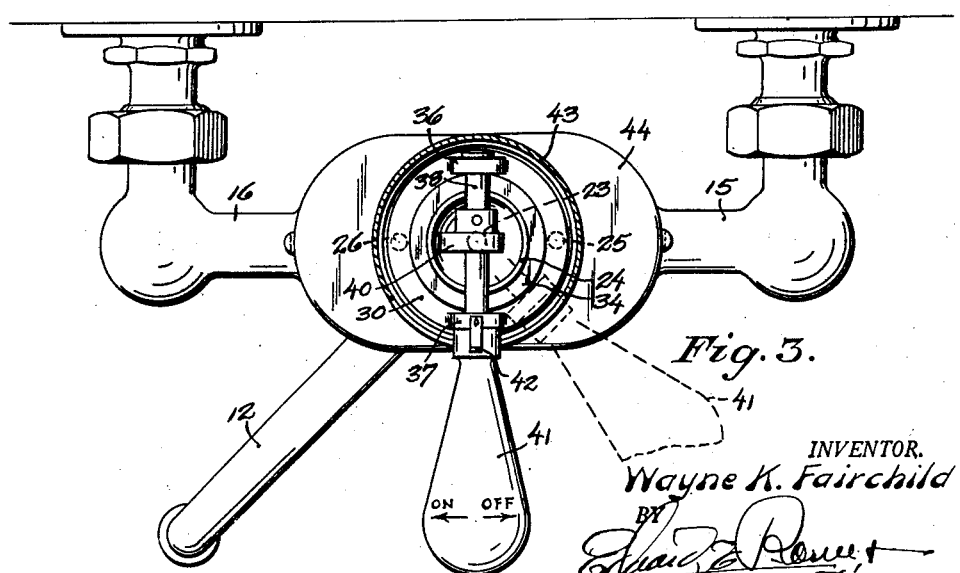
Fig. 3.
INVENTOR.
Wayne K. Fairchild
BY
atty.

Patented Aug. 22, 1950

2,519,448

UNITED STATES PATENT OFFICE 2,519,448

MIXING VALVE

Wayne K. Fairchild, Renton, Wash., assignor to Fairchild-Gross Manufacturing Co., also known as Fairchild & Gross, a copartnership Application March 14, 1947, Serial No. 734,718

12 Claims. (Cl. 277—20)

1

This invention relates to improvements in mixing devices, particularly devices for mixing pressure streams of hot and cold water, and has for its general object to provide a perfected mixing valve for this purpose.

It is a further and more particular object to provide a valve for the mixing of hot and cold water which embodies a single regulating handle common to both the hot-water and the cold-water sides of the valve, and in which this handle is made to control both the proportionate amounts of hot and cold water and the total volume of the stream delivered from the valve.

The invention has the still further and important object of providing an especially durable valve and which, for replacement of worn parts, will need be serviced only at very infrequent intervals.

As a further object still, the invention aims to provide a mixing valve incorporating reciprocally movable valve stems but characterized in that these stems are proof against leakage of water and hence obviate need for the stuffing-box assemblies embodied in the customary mixing valve.

With the foregoing and other more particular objects and advantages in view, and which will appear and be understood in the course of the following description and claims, the invention consists in the novel construction and in the adaptation and combination of parts hereinafter described and claimed.

In the accompanying drawing:

Figure 1 is a front elevational view of a mixing valve constructed in accordance with the now-preferred embodiment of the present invention, and with the control handle broken away and shown partly in section in order to illustrate the temperature-indicating pointer which otherwise would be concealed from view.

Fig. 2 is a view thereof taken to an enlarged scale and shown partly in front elevation and partly in transverse vertical section.

Fig. 3 is a horizontal sectional view on line 3—3 of Fig. 2; and

Fig. 4 is a fragmentary longitudinal vertical sectional view on line 4—4 of Fig. 2.

In the valve of the present invention, there is employed a base part 5 presenting a platform top of a generally elliptical plan configuration, and there is applied over this platform top a flexible diaphragm 6 caught about its perimeter by the depending skirt of a cap member 7 which is boltably secured upon the base. This cap member is recessed upon its underside to accommodate the flexing of the diaphragm, providing, within

2 this recess, a valve chamber 8 above and a mixing chamber 9 below the diaphragm. Formed in the face of the platform top and located at the substantial center of the ellipse is a delivery port 10 leading by a duct 11 to a swing spout 12, and at opposite sides of this port on the major axis of the ellipse there are provided respective admission ports 13 and 14 fed by ducts 15 and 16 from side branches 17 and 18, the side branches connecting by the usual fittings one with a cold-water supply pipe and the other with a hot-water supply pipe. The three ports 10, 13, and 14 each desirably present a circumscribing annulus protruding into the mixing chamber slightly above the face of the platform, and functional to press the diaphragm into seating engagement with these annuli are respective valves, as 20, 21, and 22, journaled through the cap member for vertical sliding movement on axes coinciding with the respective ports.

The stem 23 of the valve 20, in more particularly, projects through and above a centrally disposed bonnet 24 surmounting the cap member, and the two valves 21 and 22 have their stems 25—26 respectively, projecting through and above bosses 27—28 placed one at one side and the other at the other side of the bonnet. The two valve stems 25—26 are appreciably shorter than the valve stem 23, and for their depression operation rely upon a rotary cam 30 sleeved upon the bonnet, this cam presenting twin cam faces, as 31 and 32, whose negative points emanate diametrically opposite one another and thence develop progressively in opposite directions circumferentially of the cam, each said cam face spanning little more than 45°.

Above the cam is a thrust bearing which is or may be comprised of a train of balls contained in a cage 33, and giving vertical adjustment to this thrust bearing is a nut 34 working on external threads of the bonnet. Circumferentially spaced radial sockets 35 formed in the perimeter of the nut accommodate the reception of a tool to give augmented leverage for turning the nut.

Disposed to occupy positions fore and aft upon the cam and made integral therewith are upstanding brackets 36—37, and journaled in these brackets for wrist movement on a horizontal axis elevated above the upper limit of the bonnet is a shaft 38. A cam 40 is pinned or otherwise secured to this shaft in a position whereat the same will function, by rotation, to depress the valve stem 23, and also pinned to this shaft to extend forwardly as an axial prolongation thereof is a control handle 41. The control handle may be turned about its own center as an axis and may also be swung right or left about the vertical center of the cam 30 as an axis, and as will have been understood, it is believed, the first-said movement serves to regulate the volume of water delivered from the swing-spout while the second-said movement governs the proportionate amounts of hot and cold water fed into the mixing chamber. The legends "on" and "off," with appropriate direction arrows, are impressed in the surface of the handle to indicate such volume control, and there is provided a pointer 42 fast to the bracket 36 and thus swingable in unison with the bodily movement of the handle to indicate the temperature control. Markings to complement this pointer are shown impressed in the face of a cover 43 which is given a friction fit upon the neck of a subjacent closure 44.

The manner of operation is as follows:

When the control handle is turned to the right about its center as an axis the cam 40 acts upon the stem 23 to depress the delivery valve 20, and the related port of the diaphragm is flexed to cause the same to seat over the annulus of the delivery port 10, thus sealing the outlet from the mixing chamber and stopping the flow of water. Assuming that it is desired to obtain a delivery of hot water, the user simply rotates the handle to the left while at the same time swinging the handle to move the pointer to the "H" reading, the former action opening the delivery port and the latter action depressing valve 21 to cause diaphragm 18 to become seated over the annulus of the cold-water port 13. Both the valves 20 and 22 in this case having been freed of any depression influence, the pressure of the hot water serves to elevate the diaphragm off its own port as well as the delivery port 10, allowing for the flow of hot water from the swing spout. A movement of the handle to the other limit of its swinging travel, and which is to say such as will shift the pointer 42 to a "C" reading, closes the hot-water port 14 while opening the cold-water port 13. It will be apparent that a half hot-water and half cold-water mix will result from a positioning of the control handle at the mid-point of its swinging travel, both admission ports being then fully opened, and a greater or lesser amount of hot in proportion to cold water will result by shifting the handle to the left and to the right, respectively.

It is desirable, in producing the cams 39 and 40, that the same be of hardened steel and while using a softer metal for the valve stems. This assures that wear will take place on the stems rather than the cams, and to compensate for this wear the cams can be easily taken up by turning the adjusting nut 34.

The described mixing valve and the manner of its operation will, it is believed, be clear from the foregoing. Various departures from the embodiment which I have here elected to illustrate may obviously be resorted to without departing from the spirit of the invention, and no limitations are to be implied by reason of having particularly described such illustrated embodiment. It is my intention that the hereto annexed claims be read with the broadest scope commensurate with the language used.

What I claim is:

1. In a mixing valve: a valve casing, a flexible diaphragm contained in said casing and defining within the latter a mixing chamber at one side and a valve chamber at the other side of the diaphragm, the floor of said mixing chamber having three separated ports one placed central to the others and serving for the delivery of water from the mixing chamber and the other two serving one for the admission of a pressure stream of cold water and one for the admission of a pressure stream of hot water; a valve for each of said ports arranged to bear upon a related part of the diaphragm and journaled in the casing for slide movement into and from a position whereat the same acts to flex said part and depress the same into sealing engagement to the related port, the slide axes of said valves being parallel; a flanged ring mounted for rotary movement about the slide axis of said centrally placed valve and formed upon the under side of the flange with a pair of cam faces one made functional by movement of the ring in one rotary direction from neutral to depress the valve for the hot-water port and the other made functional by movement of the ring in the other rotary direction from neutral to depress the valve for the cold-water port; and means including a cam operable independently of said flanged ring for controlling the delivery valve.

2. Structure according to claim 1 in which the means last recited comprises an arm supported for turning movements about its center as an axis and having a cam fixed thereto and connecting with the inner said stem for operating the latter, the arm extending radial to the ring to also serve, by bodily swinging movement about the center of the ring as an axis, as an operating handle for the ring.

3. In a mixing valve: a valve casing having a surmounting and center-bored cylindrical neck; a flexible diaphragm contained in said casing and defining within the latter a mixing chamber below and a valve chamber above the diaphragm, the floor of said mixing chamber having three ports placed in an approximate in-line relation with the inner port serving as a delivery opening and being in axial coincidence with the center-bore of the neck and with the outer said ports removed from the delivery port a distance exceeding the radius of the neck and adapted to connect one with a pressure supply of cold water and the other with a pressure supply of hot water; a valve for each of said ports providing a head working in the valve chamber and bearing upon the diaphragm in overlying relation to the valve port and providing a stem journaled in the casing for slide movement into and from a position whereat the heads depress the diaphragm into sealing engagement to the related port, the slide axes of said stems being parallel and the two stems for the admission valves being exposed by their upper ends above the casing while the stem for the delivery valve is received through and exposed above the center-bore of the neck; a flanged ring mounted for rotary movement upon the neck of the casing and formed upon the underside of the flange with a pair of oppositely developed cam faces emanating at diametrically opposite sides of the ring and made functional one cam to the stem of one admission valve and the other cam to the stem of the other admission valve; and cam means functional to the stem of the delivery valve for operating the latter independently of the operation of the admission valves.

4. In a mixing valve: a valve casing; a flexible diaphragm contained in said casing and defining within the latter a mixing chamber below and a valve chamber above the diaphragm, the floor of said mixing chamber having a centrally placed delivery port and a pair of admission ports placed at opposite sides of the delivery ports and adapted for connection one said admission port with a pressure supply of cold water and the other said admission port with a pressure supply of hot water; means for each of said ports arranged to press upon the diaphragm and journaled for slide movement on parallel axes into and from a position whereat the same act upon related parts of the diaphragm to flex said parts into sealing engagement to the related port; a member mounted for rotary movement about the slide axis of said centrally placed valve and by movement in one rotary direction from neutral made active upon the presser means for the cold-water port to effectuate a sealing of the cold-water port and by movement in the other rotary direction from neutral made active upon the presser means for the hot-water port to effectuate a sealing of the hot-water port; an arm carried by and extending in a radial direction from said rotary means and serving as an operating handle for rotating the rotary means, said arm being journaled for rotation about its center as an axis; and cam means operatively connecting said arm with the presser means for the delivery port and by movement of the arm in opposite rotary directions about its said center as an axis acting upon the related presser means to move the latter into and from a position whereat the same effectuates a sealing of the delivery port.

5. Structure according to claim 3, and an activating means common to both of said controls, and namely to the flanged ring and to the control for the delivery valve.

6. In a mixing valve: a valve casing having a surmounting and center-bored cylindrical neck; a flexible diaphragm contained in said casing and defining within the latter a mixing chamber below and a valve chamber above the diaphragm, the floor of said mixing chamber having three ports placed in an approximate in-line relation with the central port being in axial coincidence with the cylindrical neck and serving as a delivery opening and with the other two ports removed therefrom a distance exceeding the radius of the neck and adapted to connect one with a pressure supply of hot water; a valve for each of said ports providing a head working in the valve chamber and bearing upon the diaphragm in overlying relation to the related port and also providing a stem journaled in the casing for slide movement into and from a position whereat the head depresses the diaphragm into sealing engagement to the related port, the slide axes of said stems being parallel and the two outer said stems being exposed by their upper ends above the casing while the inner said stem is received through and exposed above the center-bore of the neck; a flanged ring mounted for rotary movement upon the neck of the casing and formed upon the underside of the flange with a pair of oppositely developed cam faces emanating at diametrically opposite sides of the ring and made functional one cam to the exposed end of one of the outer said stems and the other cam to the exposed end of the other outer stem whereby movement of the ring in one rotary direction from neutral acts upon one of the outer stems to effectuate a sealing of the cold-water port and by movement of the ring in the other rotary direction from neutral acts upon the other of the outer stems to seal the hot-water port; and cam means carried by the flanged ring and made functional to the exposed end of the inner said stem for activating the latter to effectuate a sealing of the delivery port.

7. In a mixing valve: a valve casing having a surmounting and center-bored cylindrical neck; a flexible diaphragm contained in said casing and defining within the latter a mixing chamber below and a valve chamber above the diaphragm, the floor of said mixing chamber having three ports placed in an approximate in-line relation with the inner port serving as a delivery opening and being in axial coincidence with the center-bore of the neck and with the outer said ports removed from the delivery port a distance exceeding the radius of the neck and adapted to connect one with a pressure supply of cold water and the other with a pressure supply of hot water; a valve for each of said ports providing a head working in the valve chamber and bearing upon the diaphragm in overlying relation to the valve port and providing a stem journaled in the casing for slide movement into and from a position whereat the heads depress the diaphragm into sealing engagement to the related port, the slide axes of said stems being parallel and the two stems for the admission valves being exposed by their upper ends above the casing while the stem for the delivery valve is received through and exposed above the center-bore of the neck; a flanged ring mounted for rotary movement upon the neck of the casing and formed upon the underside of the flange with a pair of oppositely developed cam faces emanating at diametrically opposite sides of the ring and made functional one cam to the stem of one admission valve and the other cam to the stem of the other admission valve; means functional to the stem of the delivery valve for operating the latter independently of the operation of the admission valve; and a take-up for adjusting the flanged ring in a direction endwise of its axis.

8. In a mixing valve: a valve casing having a surmounting and center-bored cylindrical neck; a flexible diaphragm contained in said casing and defining within the latter a mixing chamber below and a valve chamber above the diaphragm, the floor of said mixing chamber having three ports placed in an approximate in-line relation with the inner port serving as a delivery opening and being in axial coincidence with the center-bore of the neck and with the outer said ports removed from the delivery port a distance exceeding the radius of the neck and adapted to connect one with a pressure supply of cold water and the other with a pressure supply of hot water; a valve for each of said ports providing a head working in the valve chamber and bearing upon the diaphragm in overlying relation to the valve port and providing a stem journaled in the casing for slide movement into and from a position whereat the heads depress the diaphragm into sealing engagement to the related port, the slide axes of said stems being parallel and the two stems for the admission valves being exposed by their upper ends above the casing while the stem for the delivery valve is received through and exposed above the center-bore of the neck; a flanged ring mounted for rotary movement upon the neck of the casing and formed upon the underside of the flange with a pair of oppositely developed cam faces emanating at diametrically opposite sides of the ring and made functional one cam to the stem of one admission valve and the other cam to the stem of the other admission valve; means functional to the stem of the delivery valve for operating the latter independently of the operation of the admission valve; and means bearing against the flanged ring to resist the thrust of the pressure water fed to the mixing chamber, said thrust-bearing comprising a nut threaded for endwise adjustment on the neck of the casing.

9. The mixing valve of claim 8 having a series of cage-carried balls interposed between the flanged ring and the adjusting nut to permit friction-free turning movements of the former.

10. In a mixing valve: a valve casing; a flexible diaphragm contained in said casing and defining within the latter a mixing chamber at one side and a valve chamber at the other side of the diaphragm, the floor of said mixing chamber providing an outlet opening and having two separated ports one for the admission of a pressure stream of hot and the other for the admission of a pressure stream of cold water; a valve for each of said ports working in the valve chamber and arranged to bear upon a related part of the diaphragm and journaled in the casing for slide movement into and from a position whereat the same acts to flex said part and depress the same into sealing engagement to the related port, the slide axes of said valves being parallel; a ring journal-mounted by the casing for rotary movement about an axis disposed approximately centrally between the slide axes and in paralleling relation to the latter and formed upon its underside with cam faces made functional by movement of the ring in one rotary direction from neutral to depress the valve for the hot-water port and in the other rotary direction from neutral to depress the valve for the cold-water port, said ring being provided at diametrically opposite sides with upstanding brackets; and a control arm engaging said brackets and extending by an end radially outwardly beyond the ring for imparting turning movements to the ring.

11. Structure according to claim 10 in which the outlet opening is placed to axially coincide with the rotary axis of the ring, and having a third valve for said outlet opening arranged to bear upon a related part of the diaphragm and journaled for slide movement on said coinciding axis with its upper end exposed above the ring, said control arm being journaled in the brackets for wrist movement about its center as an axis and carrying a cam operative by said wrist movement to depress the third said valve.

12. Structure according to claim 10 in which the journal mounting for the ring is comprised of a cylindrical neck integrated with the casing and having a part thereof exposed beyond the ring at the end of the latter opposite the diaphragm, and a thrust member sustained by said exposed part of the neck and bearing against the flanged ring to resist the thrust of the pressure water fed to the mixing chamber.

WAYNE K. FAIRCHILD.

REFERENCES CITED

The following references are of record in the file of this patent:

UNITED STATES PATENTS

| Number | Name | Date |
|---|---|---|
| 1,095,003 | Leonard | Apr. 28, 1914 |
| 1,919,234 | Leigh | July 25, 1933 |
| 2,153,029 | Tarris | Apr. 4, 1939 |
| 2,238,916 | Powers | Apr. 22, 1941 |

FOREIGN PATENTS

| Number | Country | Date |
|---|---|---|
| 106,969 | Austria | Aug. 10, 1927 |
| 511,989 | France | Oct. 2, 1920 |
| 658,144 | Germany | Mar. 23, 1938 |
| 672,325 | Germany | Mar. 1, 1939 |